J. Montgomery,
Bee Hive
No. 98,612. Patented Jan. 4, 1870.
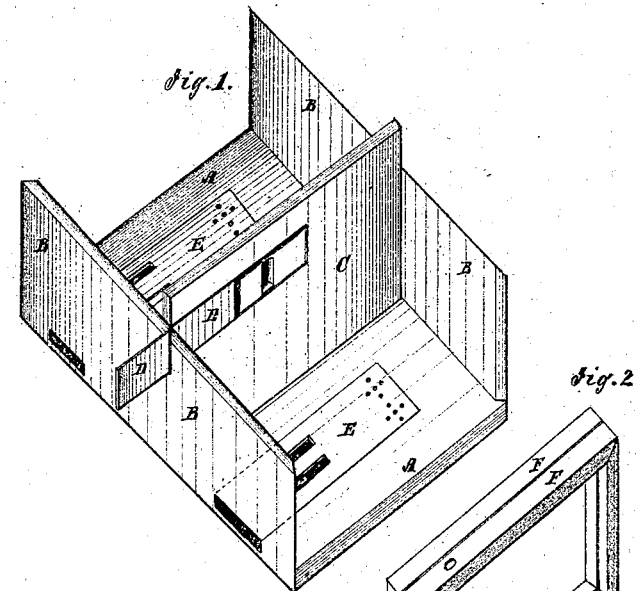
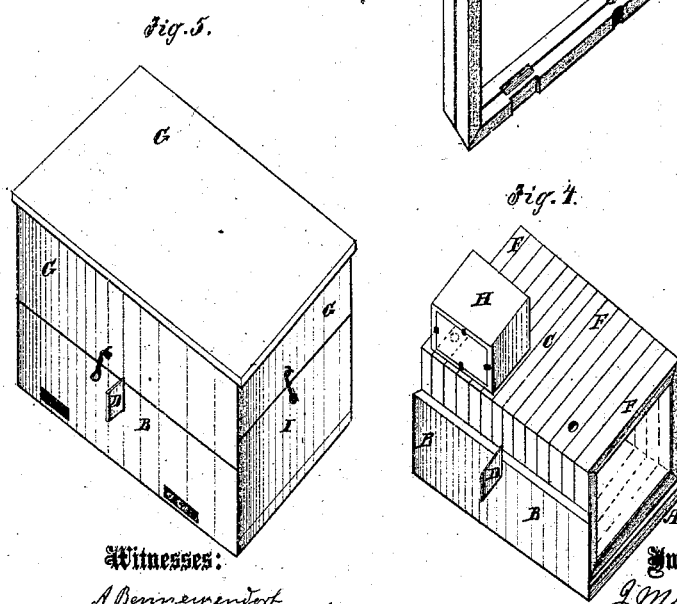
Witnesses:
A Bennewendorf
Alex F. Roberts
Inventor:
J. Montgomery
Per Mmmrh
Attorneys.

United States Patent Office.

JOHN MONTGOMERY, OF UNION CITY, TENNESSEE.

Letters Patent No. 98,612, dated January 4, 1870.

IMPROVEMENT IN BEE-HIVES.

The Schedule referred to in these Letters Patent and making part of the same.

*To all whom it may concern:*

Be it known that I, JOHN MONTGOMERY, of Union City, in the county of Obion, and State of Tennessee, have invented a new and improved Bee-Hive; and I do hereby declare that the following is a full, clear, and exact description thereof, which will enable others skilled in the art to make and use the same, reference being had to the accompanying drawings, forming part of this specification, in which—

Figure 1 is a perspective view of my improved hive, the cap, doors, and frames being removed.

Figure 2 is a detail perspective view of two of the frames.

Figure 3 is a vertical cross-section of one of the frames.

Figure 4 is a perspective view of the hive, with the cap and doors removed.

Figure 5 is a perspective view of the same, complete.

Similar letters of reference indicate corresponding parts.

My invention has for its object to furnish a simple and convenient bee-hive, which shall be so constructed and arranged as to greatly facilitate the management of the bees, and which will, at the same time, protect the hive from the ingress of the moth; and It consists in the construction and combination of various parts of the hive, as hereinafter more fully described.

A is the bottom board of the hive, to the side edges of which are attached the stationary side boards B.

C is a partition crossing the centre of the bottom board A, and the edges of which are secured to said bottom board A and to the side boards B, thus dividing the hive into two compartments or sections. The partition C has a hole formed through it, to allow the bees to pass from one compartment to the other.

This hole or opening is closed by a slide, D, passing in through a slit in the side board B, so that it may be operated to open or close said opening from the outside of the hive.

The bottom board A, in the middle part of each section, is recessed, said recesses being about three-fourths of an inch deep, three and a quarter inches wide, and extending from one side of the hive about three-fourths of the distance across said bottom-board.

These recesses are continued through the side of the hive, and within the hive are covered with a metallic plate, E, let into the bottom board A, so that its upper surface may be flush with the surface of the said bottom board.

In or near the middle parts of the plates E are formed two openings, which are formed by slitting the said plate E, and then binding the said plate around said slits downward, so as to reach about half way to the bottom of the recesses in the board A. The openings thus formed are the entrance-openings for the bees, and the manner in which they are formed prevents the entrance of the moth.

In the plates E, near their inner ends, are formed small perforations, as shown in fig. 1.

F are frames, seven (more or less) of which are placed side by side in each section or compartment of the hive.

The frames F, I prefer to make about ten by twelve inches, inside measurement, or of such a size as to fit into the space between the side-boards B, and to equal the height of the partition C. The frames F should be about one inch thick, and one and five-eighths inch wide, and should be jointed, so as to fit closely to each other, and thus form, when placed side by side, a close box.

The end frames should have glass set in them, as shown in fig. 3.

The side edges of the lower side of the top parts of the frames F are rabbeted, as shown in fig. 3, to form a downwardly-projecting bead, for the attachment of the comb, so that the frames may not be glued together by the bees in attaching the comb, thus allowing each frame and its attached comb to be removed separately.

In the lower bars of the frames F, that are over the holes in the plates E, are formed corresponding holes, so as to be a continuation of the entrance-passages; and in the said frames, directly over the small perforations in the plates E, are formed openings, so as to be a continuation of said perforations, as shown in fig. 2.

G is a cap, which fits over the upper parts of the frames F, and the lower edges of which rest upon the upper edges of the side boards B.

The upper edges of the side boards B, and the lower edges of the side-boards of the cap G should be bevelled, as shown in fig. 1, to prevent the entrance of water.

Honey-boxes H may be placed upon the upper parts of the frames F, within the cap G, holes being made through the bottoms of said boxes, and corresponding holes being made through the top bars of the frame F, to allow the bees to pass into said boxes, to store the surplus honey. The boxes H are covered by the cap G.

The ends of the hive beneath the end edges of the cap G are closed by doors, shutters, or detachable panels, I, so that they may be removed to obtain a view of the interior of the hive, through the glass plates of the end frames F. The cap G is secured in place by hooks or other conveniently-detachable fastenings.

Having thus described my invention,

I claim as new, and desire to secure by Letters Patent—

1. The combination of the frames F with each other, with the recessed bottom board A, side boards B, partition C, and cap G, said frames being so constructed and arranged, that when put together they may form a close box, substantially as herein shown and described, and for the purpose set forth.

2. The perforated metallic plates E, constructed substantially as herein shown and described, in combination with the recessed bottom boards A, and with the frames F, as and for the purpose set forth.

The above specification of my invention signed by me, this 8th day of November, 1869.

JOHN MONTGOMERY.

Witnesses:
 WM. M. MARTIN,
 B. H. BRANSFORD.